W. ALISON.
ATTACHMENT TO BINDERS.
APPLICATION FILED NOV. 28, 1913.
1,099,274.
Patented June 9, 1914.
2 SHEETS—SHEET 1.
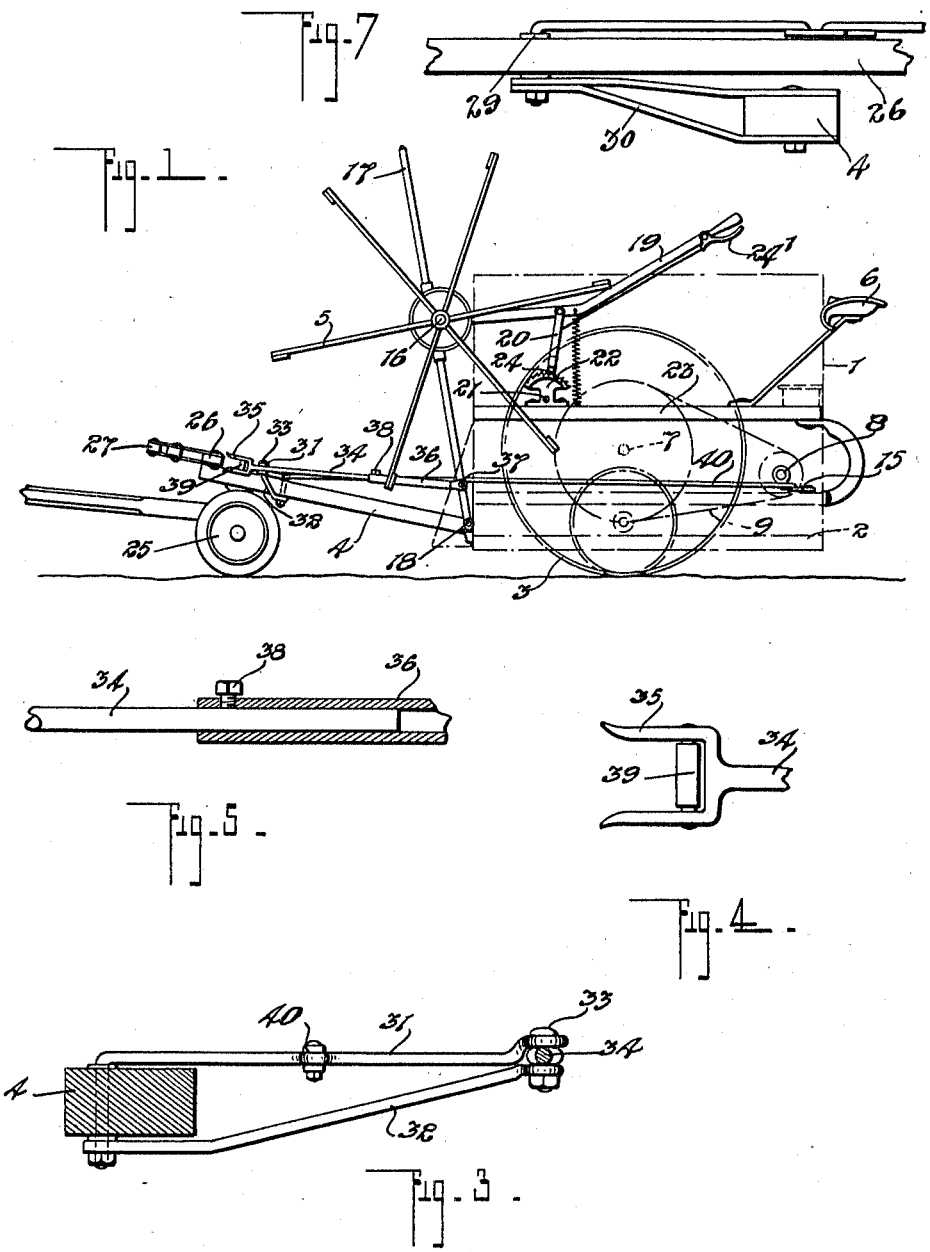
WITNESSES
INVENTOR
Wm Alison
By
Attorney.

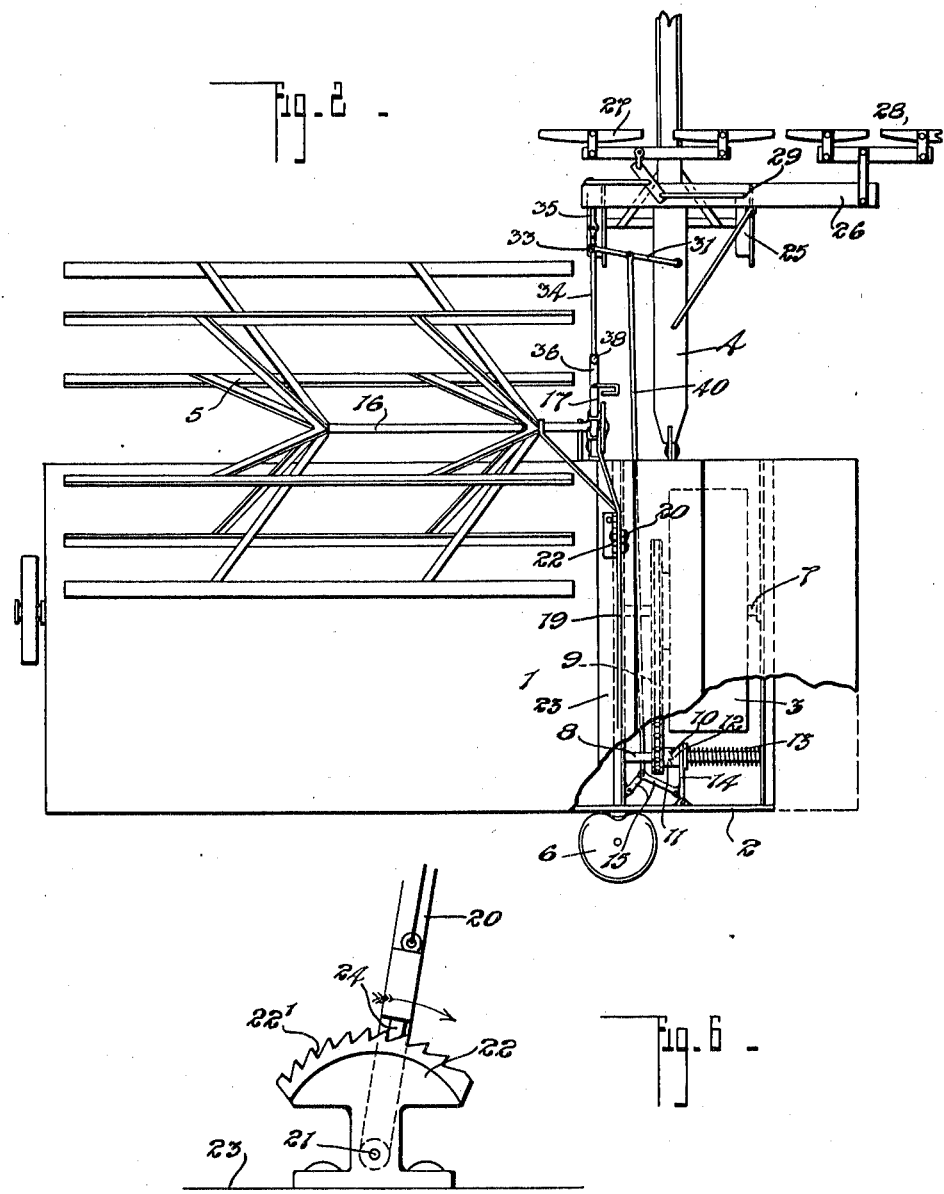

UNITED STATES PATENT OFFICE.

WILLIAM ALISON, OF DELORAINE, MANITOBA, CANADA.

ATTACHMENT TO BINDERS.

1,099,274.  Specification of Letters Patent.  Patented June 9, 1914.

Application filed November 28, 1913. Serial No. 803,500.

*To all whom it may concern:*

Be it known that I, WILLIAM ALISON, of the town of Deloraine, in the Province of Manitoba, Canada, have invented certain new and useful Improvements in Attachments to Binders, of which the following is the specification.

The invention relates to improvements in attachments to binders especially to binders where trucks are used and the object of the invention is to provide a device which will prevent the attached draft animals on the knife or grain side from coming into contact with the binder reel in making a turn, a particular feature of the invention residing in the provision of means which will automatically throw back the reel when the draft animals on the knife or grain side drop back.

With the above object in view the invention consists essentially in the arrangement and construction of parts hereinafter more particularly described and later pointed out in the appended claims.

Figure 1 represents a side view of the device applied on a binder. Fig. 2 represents a plan view of the same. Fig. 3 represents an enlarged detailed front view of the pivoted arms carried by the short tongue of the binder. Fig. 4 represents an enlarged detailed side view of the jaw. Fig. 5 represents an enlarged detailed side view, part in section of the telescoping tube and rod. Fig. 6 represents an enlarged detailed side view of the quadrant. Fig. 7 represents an enlarged detailed front view of the pivoted connection between the double tree and the short tongue of the binder.

In the drawings like characters of reference indicate corresponding parts in each figure.

1 represents the binder of which 2 is the frame, 3 the master wheel, 4 the short tongue, 5 the reel and 6 the operator's seat.

7 is a drive shaft on which the master wheel is mounted and 8 is the usual counter shaft of the binder driven by the main shaft through a suitable connection 9.

10 is a clutch on the counter shaft formed from suitable clutch members 11 and 12 one of which is connected with the drive connection while the other is controlled by the action of a spring 13 and a pivoted bar 14 carried by the frame, the bar being controlled by a pair of links 15 having their ends fastened respectively to the bar and to the binder frame. The object of this arrangement will be later explained.

16 represents the reel shaft having one end thereof slidably mounted on the reel post 17 which post has the lower end thereof pivotally secured as is customary at 18 to the binder frame. The position of the reel shaft is controlled by a lever 19 which extends backwardly toward the operator's seat and is supported by a bar 20 pivotally secured at 21 to the quadrant 22 carried by the beam 23 of the binder. A spring pressed dog 24 operates over the quadrant which dog is controlled by a suitable hand latch 24' carried by the lever. By grasping the hand latch and thereby withdrawing the dog 24 one can set the post and consequently the reel in any desired position as will readily be understood.

The above parts giving the adjustment to the reel are all of ordinary construction with the exception that the teeth 22' of the quadrant and the dog 24 are arranged so that the dog 24 can clear over the teeth 22' upon the bar 20 being forced backwardly in the direction indicated by the arrow Fig. 6. In present constructions the teeth are so arranged that once the dog is locked no movement can take place in either direction until it is released by the hand latch. The reason for my particular construction will be apparent hereinafter.

25 represents the front trucks of the binder which trucks support the forward end of the tongue 4 to which they are pivotally connected.

26 represents a double tree carrying the usual swingle trees 27 and 28 for the attachment of the draft animals. The double tree is pivotally fastened at 29 to outstanding brackets 30 secured to the forward end of the short tongue.

31 and 32 represent arms having their inner ends pivotally connected to the short tongue and their outer ends fastened together by a bolt 33 which bolt passes through the body of a shifting rod 34 having the forward end thereof fitted with a fork 35 and the rear end telescoped within a tube 36, the tube being pivotally connected to the reel post at 37.

38 is an adjusting screw carried by the tube and engaging with the shifting rod.

The fork 35 is located directly behind the inner end of the double tree which it is arranged to span. A roller 39 is carried by the fork which roller is designed to engage with the back edge of the double tree.

A rod 40 connects the arm 31 with the links 15. I wish it here to be noticed that the links 15 are normally in a position such that when the rod 40 is shifted backwardly the links straighten out so to speak, and disengage the clutch members and in so doing stop the rotation of the counter shaft and consequently all working parts of the binder.

In actual practice once the reel is adjusted by means of the lever 19 the screw 38 is adjusted to place the fork 35 at the proper distance behind the inner end of the double tree. This distance is judged by the driver and depends entirely on how quickly he wishes the device to act to throw the reel back when a turn is made.

It will be seen that when the draft animals are attached and a turn is made, the inner end of the double tree will fall back and engage with the fork with the result that the reel is automatically swung back through the action of the shifting rod 34 while the working parts of the binder are also automatically thrown out of commission through the action of the rod 40. In this way it is impossible for the draft animal on the inner or reel side to engage with the reel and damage it.

I might explain that the present practice, when trucks are used with binders, is to place the double tree far enough in advance of the binder to prevent the inside horse from contacting with the reel when a turn is made. By hitching in this manner however much effective power is lost on account of the animals being so far in advance of the binder. With my invention the draft animals can be hitched close to the binder with the result that much effective power is saved.

What I claim as my invention is:

1. The combination with a binder provided with the usual short binder tongue and with a pivoted reel post, a reel carried by the post, a truck supporting the forward end of the short tongue and pivotally connected to the same, a pivoted double tree carried by the short tongue said double tree having the inner end thereof crossing the tongue, of means actuated by the inner end of the double tree in swinging backwardly designed to swing the reel post backwardly, as and for the purpose specified.

2. The combination with a binder provided with the usual short binder tongue and with a pivoted reel post, a reel carried by the post, a truck supporting the forward end of the short tongue and pivotally connected to the same, a pivoted double tree carried by the short tongue said double tree having the inner end thereof crossing the tongue, of a suitably supported shifting rod having the rear end connected to the reel post and the forward end located behind the inner end of the double tree, as and for the purpose specified.

3. The combination with a binder provided with the usual short binder tongue and with a pivoted reel post, a reel carried by the post, a truck supporting the forward end of the short tongue and pivotally connected to the same, a pivoted double tree carried by the short tongue said double tree having the inner end thereof crossing the tongue, of a suitably supported adjustable shifting rod connected to the reel post and having the forward end thereof forked and located behind the inner end of the double tree, as and for the purpose specified.

4. The combination with a binder provided with the usual short binder tongue and with a pivoted reel post, a reel carried by the post, a truck supporting the forward end of the short tongue and pivotally connected to the same, a pivoted double tree carried by the short tongue said double tree having the inner end thereof crossing the tongue, of outstanding arms pivotally secured to the short tongue, an adjustable shifting rod pivotally connected to the outstanding ends of the arms, said rod having the rear end connected pivotally to the reel post and the forward end provided with a fork, the said fork being located directly behind the inner end of the double tree, as and for the purpose specified.

5. The combination with a binder provided with the usual short binder tongue and with a pivoted reel post, a reel carried by the post a truck supporting the forward end of the short tongue and pivotally connected to the same, a pivoted double tree carried by the short tongue said double tree having the inner end thereof crossing the tongue, and the binding mechanism of the binder, of outstanding arms pivotally secured to the short tongue, an adjustable shifting rod pivotally connected to the outstanding ends of the arms, said rod having the rear end connected pivotally to the reel post and the forward end provided with a fork, the said fork being located directly behind the inner end of the double tree and being designed to be engaged and pressed backwardly by the inner end of the double tree upon the same swinging rearwardly and means actuated by the movement of the shifting rod for automatically throwing the binding mechanism out of commission, as and for the purpose specified.

6. The combination with the reel of a binder, the short tongue of a binder and the pivoted double tree carried by the short tongue and having the inner end thereof crossing the tongue, said double tree being for the attachment of the inner and outer draft animals, of means engaged by the inner end of the double tree upon the inner draft animals falling back designed to force back the reel away from the inner draft animals, as and for the purpose specified.

Signed at Deloraine this 17th day of October 1913.

WILLIAM ALISON.

In the presence of—
V. W. BAKER,
J. M. GEORGE.

Copies of this patent may be obtained for five cents each, by addressing the "Commissioner of Patents, Washington, D. C."